United States Patent [19]

Wolfer

[11] 4,028,676

[45] June 7, 1977

[54] CONTROL OF PERIPHERAL APPARATUS IN TELECOMMUNICATION

[75] Inventor: Gerhard Wolfer, Oberengstringen, Switzerland

[73] Assignee: Siemens-Albis Aktiengesellschaft, Zurich, Switzerland

[22] Filed: Apr. 8, 1976

[21] Appl. No.: 675,091

Related U.S. Application Data

[63] Continuation of Ser. No. 603,486, Aug. 11, 1975, abandoned.

[30] Foreign Application Priority Data

Aug. 22, 1974 Switzerland ............... 011480/74

[52] U.S. Cl. .................. 340/147 SC; 179/18 J; 179/175.2 C
[51] Int. Cl.² .................. H04Q 9/00; H01M 3/00
[58] Field of Search ..... 340/147 R, 147 SC, 147 P, 340/149 R; 178/69; 179/175.21, 18 ES, 18 J, 175.2 C

[56] References Cited

UNITED STATES PATENTS

| | | | |
|---|---|---|---|
| 3,624,372 | 11/1971 | Philip et al. | 340/149 R |
| 3,710,029 | 1/1973 | Grossman | 340/147 P |
| 3,787,633 | 1/1974 | Busch | 179/18 J |
| 3,812,299 | 5/1974 | Fleischfresser et al. | 179/175.2 C |
| 3,851,311 | 11/1974 | Mila | 340/147 R |
| 3,875,390 | 4/1975 | Eccles et al. | 235/153 |

FOREIGN PATENTS OR APPLICATIONS

| | | |
|---|---|---|
| 1,487,631 | 9/1970 | Germany |
| 2,217,665 | 6/1974 | Germany |

OTHER PUBLICATIONS

"Massnahmen zur Sicherstellung der Zuverlassigkeit im Fernsprech-Vermittlungssystem HE-60 L" (Preventive Measures for Assuring the Reliability of the Telephone Exchange System Type HE-60 L, by H. Willrett, in SEL-Nachrichten (SEL News), vol. 11, issue No. 3 (1963) pp. 145–149.

"Programmgesteuerte elektronische Fernsprechvermittlungssysteme ESS Nr. 1 und ESS Nr. 100" (Program Controlled Electronic Long-Distance Telephone Exchange Systems Types ESS Nr. 1; ESS Nr. 100), by Woite, in NTZ 1966, Issue No. 2 pp. 122–124.

Primary Examiner—Donald J. Yusko
Attorney, Agent, or Firm—Benoit Law Corporation

[57] ABSTRACT

Methods and apparatus are disclosed for controlling peripheral units in a telecommunication system by means of two or more like control apparatus, wherein the peripheral units are assembled in groups, each of which is associated with its own switching means for selectively connecting the particular group to a control apparatus. The control of all peripheral units to be controlled at a given time is effected with only one of said like control apparatus at that time. Each active control apparatus is caused to time itself for a first predetermined time as to the duration of its control of said peripheral units, and to initiate a timing cycle in another one of said control apparatus for a second predetermined time longer than said first predetermined time. The control apparatus are periodically exchanged in their control function in response to the mentioned self-timing. In response to a malfunction during the performance of the control function by a particular control apparatus, the other control apparatus in which the mentioned timing cycle has then been initiated, is caused to take over the control of said peripheral units from the particular control apparatus.

23 Claims, 3 Drawing Figures

CONTROL OF PERIPHERAL APPARATUS IN TELECOMMUNICATION

This is a continuation of application Ser. No. 603,486, filed Aug. 11, 1975, now abandoned.

BACKGROUND OF THE INVENTION

1. Field of the Invention

The subject invention relates to methods and apparatus for controlling peripheral units in a telecommunication system, such as in a centrally controlled telecommunication or telephone exchange having two or more like control apparatus and having the peripheral units assembled in groups, each of which is associated with its own switching means for selectively connecting the particular group to the control apparatus.

2. Description of the Prior Art

For safety reasons, it is customary to provide the control apparatus necessary for the control of telecommunication installations in multiple form, whereby one control apparatus is always in operation and the remaining control apparatus are in reserve on a stand-by basis. A given control apparatus remains then in operation until monitoring equipment, which supervises all control apparatus, detects a disturbance or defect in the particular control apparatus then in operation, disconnects the same and permits another control apparatus to take over the operation of the defective, disconnected apparatus.

In that prior-art system, the unverifiable and therefore uncertain preparedness of the control apparatus standing by in reserve is disadvantageous and effectively results in a reduction of the safety margin. Furthermore, in the case of electro-mechanical control apparatus, a very uneven wear of the individual control apparatus takes place, since a control apparatus which is constantly in operation obviously attains a considerably higher number of switching cycles than a stand-by reserve control apparatus which takes over the control operation only in case of trouble.

SUMMARY OF THE INVENTION

It is a general object of this invention to overcome the above mentioned disadvantages.

It is a related object of this invention to provide improved methods and apparatus for controlling peripheral units in a telecommunication system by means of two or more like control apparatus.

It is a similar object of this invention to improve the preparedness, reliability and similarity of wear of control apparatus in telecommunication systems.

It is a further object of this invention to provide, in telecommunication systems of the type herein disclosed, methods and means for discovering malfunctions and narrowing down the position of defective apparatus, without the need for supervisory monitoring installations or other complex and expensive equipment.

From one aspect thereof, the subject invention resides in a method of controlling peripheral units in a telecommunication system by means of two or more like control apparatus, wherein the peripheral units are assembled in groups, each of which is associated with its own switching means for selectively connecting the particular group to a control apparatus. The invention according to this aspect resides, more specifically, in the improvement comprising in combination the steps of effecting the control of all peripheral units to be controlled at a given time with only one of said like control apparatus at that time, causing each active control apparatus to time itself for a first predetermined time as to the duration of its control of said peripheral units and to initiate a timing cycle in another one of said control apparatus for a second predetermined time longer than said first predetermined time, periodically exchanging the control apparatus in their control function in response to the mentioned self-timing, and causing in response to a malfunction during the performance of said control function by a particular control apparatus, the other control apparatus in which the mentioned timing cycle has then been initiated, to take over the control of said peripheral units from the particular control apparatus.

From another aspect thereof, the subject invention resides in apparatus for controlling peripheral units in a telecommunication system by means of two or more like control apparatus, wherein the peripheral units are assembled in groups, each of which is associated with its own switching means for selectively connecting the particular group to a control apparatus, and wherein the control of all peripheral units to be controlled at a given time is effected by only one of the mentioned like control apparatus at that time. The invention according to this aspect resides, more specifically, in the improvement comprising, in combination, means individually associated with each control apparatus for timing the particular control apparatus for a first predetermined time as to the duration of its control of said peripheral units, means for indicating a timing cycle in another one of said control apparatus for a second predetermined time longer than said first predetermined time, means connected to said timing means for periodically exchanging the control apparatus in their control function in response to the mentioned timing, and means responsive to a malfunction during the performance of said control function by a particular control apparatus for turning over said control function to the mentioned other one control apparatus in which the mentioned timing cycle has been initiated.

BRIEF DESCRIPTION OF THE DRAWINGS

Preferred embodiments of the subject invention are hereafter disclosed with the aid of the drawings, in which.

DESCRIPTION OF PREFERRED EMBODIMENTS

Figure 1:
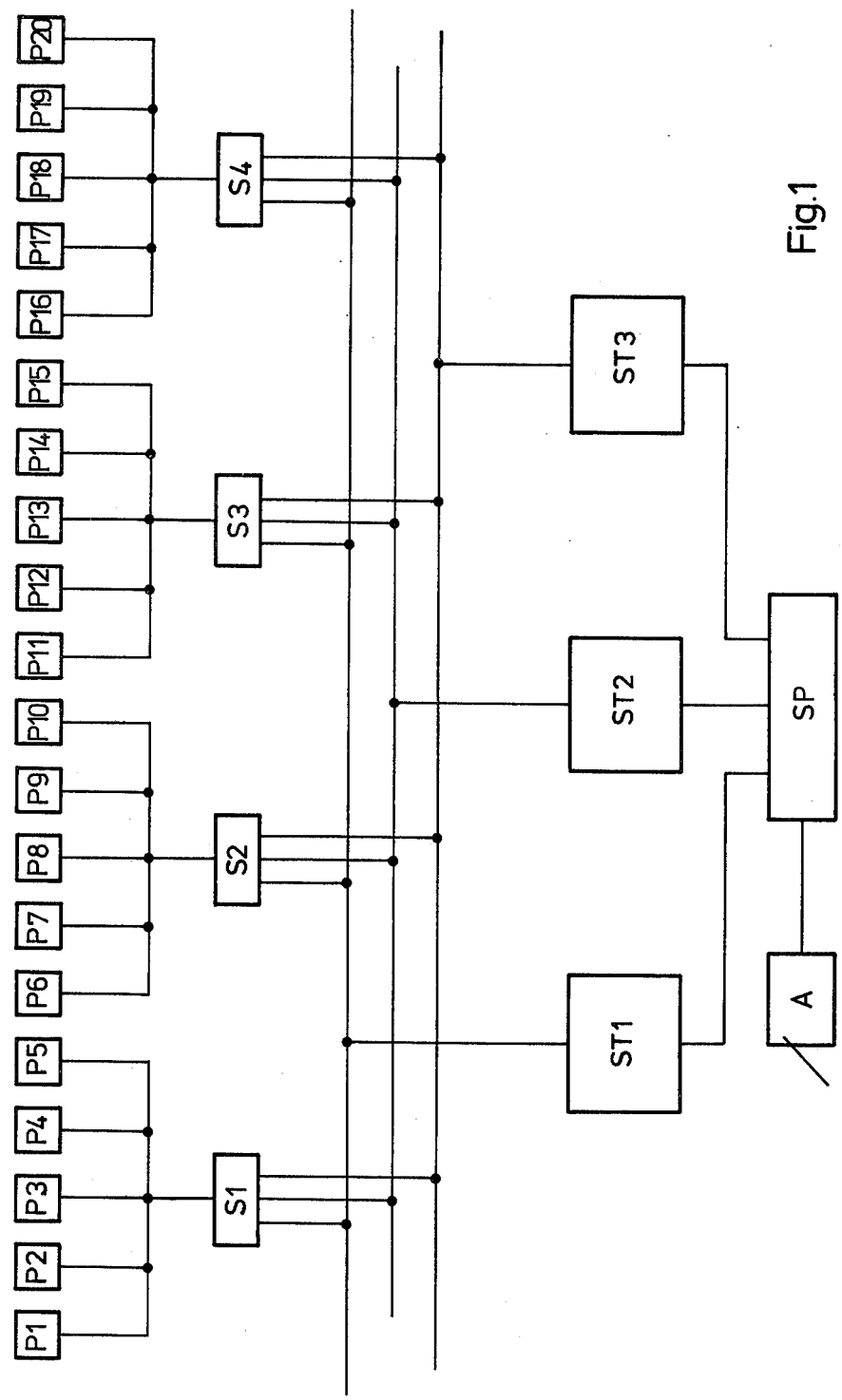
FIG. 1 is a block diagram of a telecommunication system with three control apparatus.

In the telecommunication system shown in FIG. 1, each of the three control apparatus ST1, ST2 and ST3 has access to a common central storage unit or memory SP and to all switching devices or locations S1, S2, S3 and S4. The peripherals or peripheral devices P1 to P20 to be controlled are assembled in groups P1 to P5, P6 to P10, P11 to P15 and P16 to P20, which are connected to the switching devices S1, P2, S3 and S4, respectively, permanently assigned to each group. Each of the peripheral devices P1 to P20 is individually connectable, through the switching device S1, S2, S3, or S4 assigned to it, to the control device ST1, ST2 or ST3 which is in operation at the time. A conventional output device A, which is connected to the central storage unit SP, assembles into a statistical presentation the addresses and the states of operation, as written in the storage unit SP, of the peripheral devices P1 to P20 of the switching devices S1 to S4, and of the particular control apparatus ST1, ST2 or ST3, which participates in the control operation at the moment. This statistical presentation may then be printed out by the output device A (see the Table at the end of this disclosure) or may be displayed by a data display device.

Figure 2:
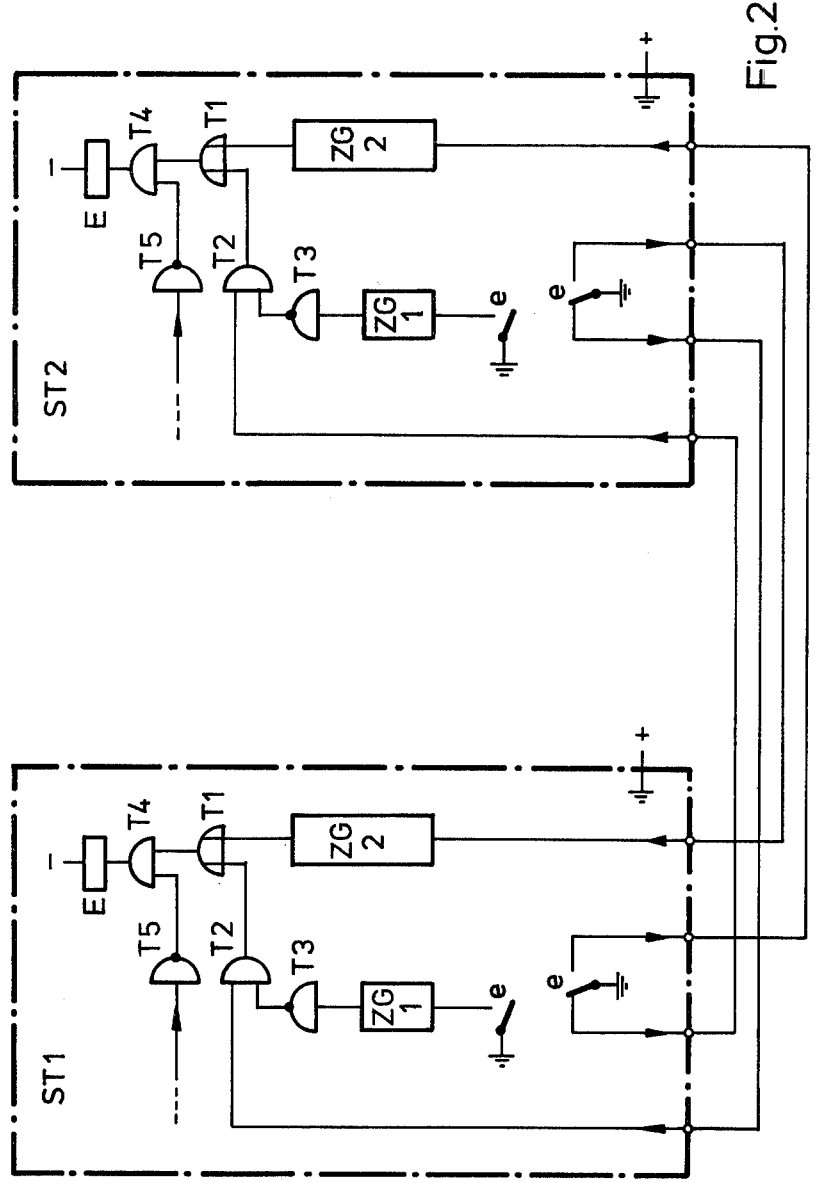
FIG. 2 is a schematic diagram of a control arrangement with two control apparatus.

FIG. 2 shows an arrangement with two identical control apparatus ST1 and ST2, each of which includes a first delay or timing device ZG1, and a second timing device ZG2 having a longer time constant than the first timing device ZG1, as well as a relay E which is coupled to the timing devices ZG1 and ZG2 via logical gate circuits or elements T1 to T4, and which has relay contacts $e$.

This relay E symbolizes in its active state the ON-condition, and in its inactive or quiescent state the OFF-condition, of the particular control apparatus ST1 or ST2. Instead of the electro-mechanical relays E of the control apparatus illustrated in FIG. 2, electronic relays may of course be used as well. Obviously to those skilled in the art, each control apparatus ST1, ST2 further includes other circuit elements and connections which serve for instance the actual control of the peripheral devices P1 to P20 and switching devices S1 to S4, the dispatch of data to the central storage unit SP, and the like, all omitted from the drawings to avoid the showing of the gist of the invention to be obscured by self-evident details.

In each control apparatus ST1, ST2, the winding of the relay E is electrically connected to a first pole (−) of the voltage or power supply (not shown) on the one hand, and to the output of a logical AND gate T4 on the other hand. A first input of the AND gate T4 in each control apparatus ST1, ST2 is electrically connected via a logical inverter T5 to a conventional fault or malfunction detector (not shown), and the second input of the AND gate T4 is electrically connected to the output of a logical OR gate T1. A first input of the OR gate T1 of each control apparatus S1 or S2 is electrically connected to the output of a logical AND gate T2, and the second input of the OR gate T1 of each control apparatus S1 or S2 is connectible, via the second timing device ZG2 and the normally open or make side of the break/make or double-throw contact $e$ of the other control apparatus S2 or S1, to a second pole (+ or ground) of the supply voltage.

A first input of the logical AND gate T2 of each control apparatus ST1 or ST2 is electrically connected, via the normally closed or break side of the double-throw contact $e$ of the other control apparatus S2 or S1, to the second pole (+ or ground) of the supply voltage, and the second input of the logical AND gate T2 is connectible, via a logical inverter T3, the first timing device ZG1 and the normally open or make contact $e$ of the same control device, to the second pole (+ or ground) of the supply voltage.

The manner of operation of the circuit arrangement according to FIG. 2 is briefly explained as follows. In the control apparatus ST1 or ST2 which is taking over the control operation, the relay E is energized and, in turn, activates its associated timing device ZG1, on the one hand, and also activates the second timing device ZG2 of the control apparatus ST2 or ST1 which is not then in operation. Up to the completion of its timing cycle, the first timing device ZG1 applies a logical "0" to the inverter T3 connected thereto, and the inverter T3, in turn, then applies a logical "L" to the second input of the AND gate T2. The relay E of the control apparatus ST1 or ST2 then in operation is and remains energized in this manner, as long as a logical L is likewise present at the first input of the AND gate T2 of that control apparatus ST1 or ST2, when no fault indication is then present at the input of the inverter T5 on the one hand, and the relay E of the control apparatus ST2 or ST1 not then in operation, is not then energized on the other hand.

The logical L which is issued by the first timing device ZG1 after completion of its timing cycle reaches after its inversion by the inverter T3 as logical 0 the second input of the AND gate T2, whereby the relay E of that control apparatus ST1 or ST2 is deenergized.

In response to the deenergization of the relay E in the control apparatus ST1 or ST2 up to then in operation, a logical L proceeds from the normally closed or break side of the double-throw contact $e$ and reaches the first input of the AND gate T2 in the control apparatus ST2 or ST1 which has not then been in operation, whereby that control apparatus ST2 or ST1, as a result of the energization of its own relay E, then takes up the control operation. In this manner, each control apparatus ST1 or ST2 turns over the control operation to the other control apparatus ST2 or ST1.

If a first timing device ZG1 of either control apparatus ST1 or ST2 becomes defective or otherwise drops out of operation, the deactivation process of that control apparatus ST1 or ST2 is effected on the basis of the assumption of the control operation by the other control apparatus ST2 or ST1 caused by its second timing device ZG2.

In particular, if for instance the first timing device ZG1 of the control apparatus ST1 fails to issue a logical L at the end of its timing cycle, the second timing device ZG2 of the other control apparatus ST2 will, nevertheless, activate the relay E of that other control apparatus ST2 upon completion of the timing cycle of that second timing device ZG2 which, as already indicated, has a longer time constant than any first timing device ZG1.

The thus activated relay E of the second control apparatus ST2 breaks the normally closed side of its double-throw contact $e$, whereby the ground connection or logical L is removed from the first input of the AND gate T2 of the control apparatus ST1 up to then in operation. In consequence, the control apparatus ST1 is deactivated while the control apparatus ST2 takes over the control operation.

Figure 3:
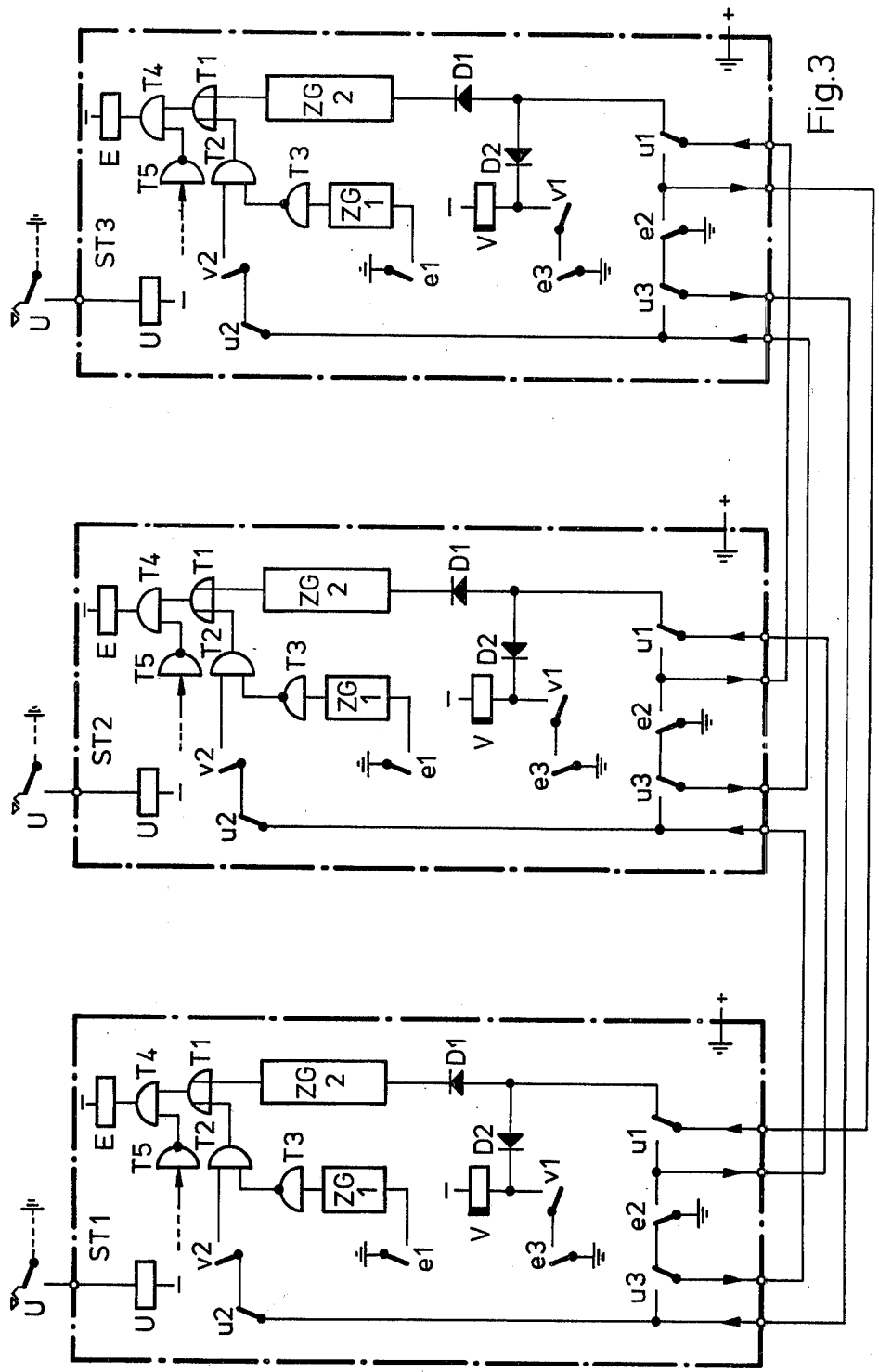
FIG. 3 is a schematic diagram of a control arrangement with three control apparatus.

FIG. 3 shows an arrangement with three identical control apparatus ST1, ST2, ST3, each of which includes a first timing device ZG1, and a second timing device ZG2 having a longer time constant than the first timing device ZG1, as well as a relay E which is coupled to the timing devices ZG1 and ZG2 via logical gate circuits or elements T1 to T4 and which has relay contacts $e1$, $e2$ and $e3$. As before, this relay E symbolizes in its active state the ON condition, and in its inactive or quiescent state the OFF condition, of the particular control apparatus ST1, ST2 or ST3. Furthermore, each control apparatus includes a delayed-release preparation or initiation relay V, as well as a change-over or switching relay U. Each relay V has relay contacts $v1$ and $v2$, and each relay U has relay contacts $u1$, $u2$ and $u3$, located in the same control apparatus as the particular relay. Here too, each of the electromechanical relays E, U and V in the control apparatus illustrated in FIG. 3, may be replaced by an electronic relay as well. Obviously to those skilled in the art, here too each control apparatus ST1, ST2 and ST3 further includes other circuit elements and connections which serve for example the actual control of the peripheral devices P and switching devices S, for the dispatch of data to the central storage unit SP, etc.

In each control apparatus ST1, ST2 and ST3, the winding of the relay E is electrically connected to the first pole (−) of the voltage or power supply (not shown) on the one hand, and to the output of the logical AND gate T4 on the other hand. A first input of the AND gate T4 in each control apparatus is electrically connected via a logical inverter T5 to a fault detector (not shown) and the second input of the AND gate T4 is electrically connected to the output of the logical OR gate T1. A first input of the logical OR gate T1 is electrically connected to the output of the logical AND gate T2. The second input of the OR gate T1 is connectible via the second timing device ZG2, a decoupling diode D1, the normally closed or quiescent side of the change-over or double-throw contact $u1$, and also the normally open or make side of the break/make or double-throw contact $e2$ of one of the other two control apparatus, or also via the normally open or make side of the change-over contact $u1$ of the one of the other two control apparatus and the normally open or make side of the contact $e2$ of the other of those two control apparatus, to the second pole (ground) of the supply voltage.

By way of example, it is seen that the second input of the OR gate T1 of the control apparatus ST1 is connectible via the second timing device ZG2, the decoupling diode D1 and the normally closed side of the contact $u1$ and further via the normally open side of the contact $e2$ of the control apparatus ST3, or via the normally open side of the contact $u1$ of the control apparatus ST3 and the normally open side of the contact $e2$ of the control apparatus ST2, to the second pole (ground) of the supply voltage.

The first input of the logical AND gate T2 is electrically connected via the normally open or make contact $v2$ and normally closed or break contact $u2$ to the normally open or make side of the double-throw contact $u3$ on the one hand and, on the other hand, in one of the two other control apparatus, to the normally closed or break side of the double-throw contact $u3$ and the normally closed or break side of the double-throw contact $e2$ to the second pole (ground) of the supply voltage.

The second input of the AND gate T2 is connectible to the second pole (ground) of the supply voltage via a logical inverter T3, the first timing device ZG1 and the normally open or make contact $e1$. One of the ends of the winding of the delayed-release preparation or initiation relay V is connectible to the second pole (ground) of the supply voltage via the normally open or make contacts $v1$ and $e3$ on the one hand and, on the other hand, via the decoupling diode D2, the normally closed or break side of the double-throw contact $u1$ and, in one of the two other control devices, via the normally open or make side of the double-throw contact $e2$.

The other end of the winding of the initiation relay V, as also one end of the winding of the changeover relay U, are electrically connected with the first pole (−) of the supply voltage. The other end of the winding of relay U is connectible to the second pole (ground) of the supply voltage via an operating switch U.

The manner of operation of the circuit arrangement according to FIG. 3 corresponds extensively to that of the circuit arrangement of FIG. 2, so that only the manner of operation of the circuit elements which are additional to FIG. 3 shall be discussed here.

The initiation relay V always responds in the particular control apparatus ST1, ST2 and ST3 which is next in line to take up the control operation; namely, on the basis of an effected connection to the second pole (ground) of the supply voltage via the decoupling diode D2, the normally closed or break side of the double-throw contact $u1$ and, in the then operative control apparatus, via the normally open but then closed side of double-throw contact $e2$ of the relay E then energized.

In the control device then in operation, the relay V maintains itself energized via the then closed contacts $v1$ and $e3$ until relay E has been deenergized.

Each change-over relay U, actuable by an operating switch U, serves by means of its normally closed or break contact $u2$ to effect a deactivation of the control apparatus ST1, ST2 or ST3 with which the particular relay U is associated; with an alternating assumption of the control operation by the two control apparatus having not then been placed out of service, being guaranteed via the double-throw or change-over contacts $u1$ and $u3$.

The Table at the end of this disclosure is part of a printout of tabulated statistical information on conditions or states of operation which have been printed out, line for line, as a result of occurring faults or malfunctions, herein designated as faults A, B, C, D, E. From this Table it becomes clearly apparent how recurring faults can be determined and their sources delimited or narrowed in. Thus, it is seen, for instance, from the lines 101, 107, 111, 118 how the fault of type A occurs during the switching control mode 2 independently of the control apparatus ST1 or ST2, but always in conjunction with the switching device S3 and the peripheral device P12. Furthermore, the fault of type A occurs in lines 104, 108 and 116 also in the course of the control mode 3, again independently of the control apparatus ST1 or ST2, but always in conjunction with the switching device S3 and the peripheral device P13. Since the other peripheral devices P11, P14 and P15 connected to the switching device S3 are not printed out on the listing of faults of the Table, there exists no certainty whether these peripherals were even participating in a control operation.

There thus exists the possibility that the fault or malfunction sources are located in the switching device S3 or in the two peripheral devices P12 and P13.

In summary, it is seen that each control apparatus ST1, ST2 or ST3 is caused to time itself by means of its first timing ZG1 individually associated with the particular control apparatus ST1, ST2 or ST3. Each of these self-timings by the timing element ZG1 operates for a first predetermined time as to the duration of the control of the peripheral units P by the particular control apparatus. Equipment including the second timing device ZG2, relay E and double-throw contact $e$ simultaneously initiates a timing cycle in another one of the control apparatus ST2, ST3 or ST1 for a second predetermined time which is longer than the mentioned first predetermined time.

The control apparatus ST1, ST2 and ST3 are periodically exchanged in their control function in response to the mentioned self-timing.

Equipment including the inverters T3 and T5 is responsive, respectively, to a failure of the timing device ZG1 or to another malfunction during the performance of the control function by a particular control apparatus ST1, ST2 or ST3, for turning over the control function to the other control apparatus ST2, ST3 or ST1 in which the timing cycle by the timing device ZG2 has been initiated.

Selectively actuable switches and associated relays U permit selective exclusion of each control apparatus ST1, ST2 or ST3 from the mentioned periodic exchange of control apparatus ST1, ST2 and ST3, and restriction of that periodic exchange to all non-excluded control apparatus (e.g. ST1, ST2; ST1, ST3; ST2, ST3).

Lines extending between the control apparatus and equipment, such as the normally closed side of the double-throw contact $u1$, associate with each of the control apparatus ST1, ST2 or ST3 a first one of the control apparatus ST2, ST3 and ST1 which is to take over the control function from the particular control apparatus ST1, ST2 or ST3, and a second one of the control apparatus ST3, ST1 or ST2 which is to take over the control function from the particular control apparatus ST1, ST2 or ST3 when the first control apparatus ST2, ST3 or ST1 has been excluded from the above mentioned periodic exchange.

Equipment including the preparation or initiation relay V selectively prepares for each of the control apparatus ST1, ST2 or ST3, during its performance of the control function and for a takeover of said control function, the associated first control apparatus ST2, ST3, ST1 when the associated first control apparatus ST2, ST3, ST1 has not been excluded from the above mentioned periodic exchange, and the associated second control apparatus ST3, ST1, ST2 when the associated first control apparatus ST2, ST3, ST1 has been excluded from said periodic exchange.

Equipment including the relay E and its double-throw contact $e2$ serves to turn over the control function to the prepared associated control apparatus ST2, ST3, ST1 upon expiration of the above mentioned predetermined time.

Upon the occurrence of a malfunction, the addresses and control modes of the peripheral units, switching devices and control apparatus which are then participating in the control operation are stored in the storage unit or memory SP, and are printed out, such as in the form of the following TABLE, to permit malfunctions to be readily detected and localized or narrowed in according to their probable sources.

The invention thus provides in a very simple manner an always reliable state of preparedness for each control apparatus ST1, ST2 and ST3 by virtue of the disclosed alternating taking up of operation and periodic exchange of the control function among the control apparatus. In this manner, an equal wear of components among the various control apparatus is reliable provided. Further advantages include the performance of a mutual monitoring function by the control apparatus ST1, ST2 and ST3 among themselves, as well as the possibility of a localization and temporary disconnection of defective apparatus or connections.

The utility of the disclosed invention is broad and extends throughout the telephone, teletyping and data communication and exchange arts. The utility of the invention is not limited to systems in which a switching or exchange operation takes place, but extends to remote control, data processing and telecommunication installations wherein a plurality of peripheral apparatus are controlled by a few control apparatus.

Such control apparatus serve, for instance, the control of exchange and switching operations in a telecommunication network or system, and exercise continuously a supervision over the prevailing states of operation of all apparatus to be controlled, or at least of the apparatus allocated to the particular control equipment. These control apparatus issue commands and control their execution.

The controlled apparatus are herein designated as peripherals or peripheral devices (P1–P20) and may, in the case of exchange or switching systems, comprise switching or connecting networks or stages, concentrators, selection stages, registers, line circuits, multiplexers, demultiplexers, lines, and the like.

The switching devices or locations (S1–S4) are the intermediate apparatus or locations between the peripheral devices (P1–P20) and the control apparatus or devices (ST1–ST3). Each switching device (S1–S4) connects the group of peripheral devices allocated thereto temporarily to one control apparatus at a time. The switching devices (S1–S4) typically are not autonomous, but may, in turn be controlled by control equipment.

The central storage unit contains all data and programs necessary for the establishment of the various connections, as well as all subscribers' control information.

The output device (A) may comprise a printer, teletype apparatus, or data viewing or display device, for a printout, by way of example, of the statistical data shown in the TABLE at the end of this disclosure.

TABLE

| Line | Control Apparatus | Fault Type | Switching Device | Peripheral Unit | Control Mode |
|---|---|---|---|---|---|
| 101 | ST1 | A | S3 | P12 | 2 |
| 102 | ST1 | B | S1 | P4 | 1 |
| 103 | ST2 | C | S2 | P7 | 4 |
| 104 | ST1 | A | S3 | P13 | 3 |
| 105 | ST2 | D | S8 | P34 | 2 |
| 106 | ST2 | C | S7 | P31 | 1 |
| 107 | ST1 | A | S3 | P12 | 2 |
| 108 | ST2 | A | S3 | P13 | 3 |
| 109 | ST1 | E | S4 | P18 | 2 |
| 110 | ST2 | D | S7 | P32 | 4 |
| 111 | ST2 | A | S3 | P12 | 2 |
| 112 | ST1 | B | S1 | P4 | 1 |
| 113 | ST2 | D | S4 | P16 | 4 |
| 114 | ST1 | C | S2 | P8 | 2 |
| 115 | ST2 | A | S1 | P2 | 1 |
| 116 | ST1 | A | S3 | P13 | 3 |
| 117 | ST2 | D | S7 | P35 | 4 |
| 118 | ST2 | A | S3 | P12 | 2 |
| 119 | ST1 | E | S5 | P21 | 3 |

We claim:

1. In a method of controlling peripheral units (P1–P20) in a telecommunication system by means of two or more like control apparatus (ST1, ST2, ST3), wherein the peripheral units (P1–P20) are assembled in groups (P1–P5, P6–P10, P11–P15, P16–P20) each of which is associated with its own switching means (S1, S2, S3 or S4) for selectively connecting the particular group (P1–P5, P6–P10, P11–P15 or P16–P20) to a control apparatus (ST1, ST2 or ST3), the improvement comprising in combination the steps of:

effecting the control of all peripheral units (P1–P20) to be controlled at a given time with only one of said like control apparatus (ST1, ST2 or ST3) at that time;

causing each active control apparatus (ST1, ST2 or ST3) to time itself for a first predetermined time as to the duration of its control of said peripheral units (P1–P20), and to initiate a timing cycle in another one of said control apparatus (ST2, ST3 or ST1) for a second predetermined time longer than said first predetermined time;

periodically exchanging the control apparatus (ST1, ST2, ST3) in their control function in response to said self-timing; and causing in response to a malfunction during the performance of said control function by a particular control apparatus (ST1, ST2 or ST3) the other control apparatus (ST2, ST3 or ST1) in which said timing cycle has then been initiated, to take over the control of said peripheral units (P1–P20) from said particular control apparatus (ST1, ST2 or ST3).

2. A method as claimed in claim 1, wherein:

said periodic exchange of control apparatus (ST1, ST2, ST3) includes the steps of associating with each of said control apparatus (ST1, ST2 or ST3) another one of said control apparatus (ST2, ST3 or ST1) which is to take over said control function from the particular control apparatus (ST1, ST2 or ST3);

preparing for each of said control apparatus (ST1, ST2 or ST3), during its performance of said control function, said associated one of said control apparatus (ST2, ST3 or ST1) for a takeover of said control function; and causing upon expiration of said first predetermined time for each of said control apparatus (ST1, ST2, ST3) its prepared associated control apparatus (ST2, ST3, ST1) to assume said control function.

3. A method as claimed in claim 1, including the steps of:

selectively excluding from said periodic exchange any of said control apparatus (ST1, ST2, ST3); and restricting said periodic exchange of said control function to all non-excluded control apparatus (e.g. ST1, ST2; ST1, ST3; ST2, ST3).

4. A method as claimed in claim 1, including the steps of:

selectively excluding from said periodic exchange any of said control apparatus (ST1, ST2, ST3);

associating with each of said control apparatus (ST1, ST2 or ST3) a first one of said control apparatus (ST2, ST3, ST1) which is to take over said control function from the particular control apparatus (ST1, ST2, ST3), and a second one of said control apparatus (ST3, ST1, ST2) which is to take over said control function from the particular control apparatus (ST1, ST2, ST3) when said first control apparatus (ST2, ST3, ST1) has been excluded from said periodic exchange;

selectively preparing for each of said control apparatus (ST1, ST2 or ST3), during its performance of said control function and for a takeover of said control function, said associated first control apparatus (ST2, ST3, ST1) when said associated first control apparatus (ST2, ST3, ST1) has not been excluded from said periodic exchange, and said associated second control apparatus (ST3, ST1, ST2) when said associated first control apparatus (ST2, ST3, ST1) has been excluded from said periodic exchange; and causing upon expiration of said first predetermined time for each of said control apparatus (ST1, ST2, ST3) the prepared control apparatus of said associated first and second control apparatus to assume said control function.

5. A method as claimed in claim 1, including the steps of:

causing a particular control apparatus (ST1, ST2 or ST3) to disconnect and exclude itself from said periodic exchange upon occurrence of a malfunction during the performance of said control function by said particular control apparatus (ST1, ST2 or ST3); and causing the other control apparatus (ST2, ST3 or ST1) in which said timing cycle has then been initiated to take over said control function from said excluded control apparatus (ST1, ST2 or ST3).

6. A method as claimed in claim 5, including the step of:

recording upon the occurrence of a malfunction the addresses and control modes of the peripheral units (P), switching devices (S) and control apparatus (ST) which are then participating in the control operation.

7. A method as claimed in claim 1, including the steps of:

determining a failure of a self-timing function in any particular control apparatus then performing said control function; and causing the other control apparatus (ST2, ST3 or ST1) in which said timing cycle has then been initiated, to take over the control of said peripheral units (P1–P20) from said particular control apparatus (ST1, ST2 or ST3).

8. A method as claimed in claim 1, wherein:

said periodic exchange of control apparatus (ST1, ST2, ST3) includes the step of causing each active control apparatus (ST1, ST2 or ST3) after expiration of said first predetermined time to turn over the control of said peripheral units (P1–P20) to the other one of said control apparatus (ST2, ST3 or ST1) in which said timing cycle has been initiated.

9. A method as claimed in claim 8, wherein:

said response to a malfunction includes the step of causing any control apparatus (ST2, ST3 or ST1) in which said timing cycle has been initiated to take over the control of said peripheral units (P1–P20) from a corresponding control apparatus upon failure of said self-timing by said corresponding control apparatus.

10. A method as claimed in claim 8, wherein:

said response to a malfunction includes the step of causing any control apparatus (ST2, ST3 or ST1) in which said timing cycle has been initiated to take over the control of said peripheral units (P1–P20) from a corresponding control apparatus upon failure of said self-timing by said corresponding control apparatus and in response to expiration of said second predetermined time (ZG2).

11. A method as claimed in claim 1, wherein:

said periodic exchange of control apparatus (ST1, ST2, ST3) includes the step of causing each active control apparatus (ST1, ST2 or ST3) after expiration of said first predetermined time to turn over the control of said peripheral units (P1–P20) to the other one of said control apparatus (ST2, ST3 or ST1) in which said timing cycle has been initiated; and said response to a malfunction includes the step of causing any control apparatus (ST2, ST3 or ST1) in which said timing cycle has been initiated to take over the control of said peripheral units (P1–P20) from a corresponding control apparatus upon failure of said self-timing by said corresponding control apparatus.

12. In apparatus for controlling peripheral units (P1–P20) in a telecommunication system by means of two or more like control apparatus (ST1, ST2, ST3), wherein the peripheral units (P1–P20) are assembled in groups (P1–P5, P6–P10, P11–P15, P16–P20) each of which is associated with its own switching means (S1, S2, S3 or S4) for selectively connecting the particular group (P1–P5, P6–P10, P11–P15 or P16–P20) to a control apparatus (ST1, ST2 or ST3), and wherein the control of all peripheral units (P1–P20) to be controlled at a given time is effected by only one of said like control apparatus (ST1, ST2 or ST3) at that time, the improvement comprising in combination:

means (ZG1) individually associated with each control apparatus (ST1, ST2 or ST3) for timing the particular control apparatus for a first predetermined time as to the duration of its control of said peripheral units (P1–P20);

means (E, ZG2) for initiating a timing cycle in another one of said control apparatus (ST2, ST3 or ST1) for a second predetermined time longer than said first predetermined time;

means connected to said timing means (ZG1) for periodically exchanging the control apparatus (ST1, ST2, ST3) in their control function in response to said timing; and means (T3, T5) responsive to a malfunction during the performance of said control function by a particular control apparatus (ST1, ST2 or ST3) for turning over said control function to said other one control apparatus (ST2, ST3 or ST1) in which said timing cycle has been initiated.

13. Apparatus as claimed in claim 12, including:

means (u1) for associating with each of said control apparatus (ST1, ST2 or ST3) another one of said control apparatus (ST2, ST3 or ST1) which is to take over said control function from the particular control apparatus (ST1, ST2 or ST3);

means (V) connected to said associating means (u1) for preparing for each of said control apparatus (ST1, ST2 or ST3), during its performance of said control function, said associated one of said control apparatus (ST2, ST3 or ST1) for a takeover of said control function; and means (E, e2) for turning over said control function to the prepared associated control apparatus ST2, ST3, ST1; ST3, ST1, ST2) upon expiration of said first predetermined time.

14. Apparatus as claimed in claim 13, wherein:
each control apparatus (ST1, ST2 or ST3) includes its own preparing means (V) and its own control function turnover means (E, e2).

15. Apparatus as claimed in claim 12, including:
means (U) for selectively excluding from said periodic exchange any of said control apparatus (ST1, ST2, ST3) and for restricting said periodic exchange of said control function to all non-excluded control apparatus (e.g. ST1, ST2; ST1, ST3; ST2, ST3).

16. Apparatus as claimed in claim 15, wherein:
each control apparatus (ST1, ST2 or ST3) includes its own means (U) for selectively excluding it from said periodic exchange.

17. Apparatus as claimed in claim 12, including:
means (U) for selectively excluding from said periodic exchange any of said control apparatus (ST1, ST2 or ST3);

means (u1) for associating with each of said control apparatus (ST1, ST2 or ST3) a first one of said control apparatus (ST2, ST3, ST1) which is to take over said control function from the particular control apparatus (ST1, ST2, ST3), and a second one of said control apparatus (ST3, ST1, ST2) which is to take over said control function from the particular control apparatus (ST1, ST2, ST3) when said first control apparatus (ST2, ST3, ST1) has been excluded from said periodic exchange;

means (V) connected to said associating means (u1) for selectively preparing for each of said control apparatus (ST1, ST2 or ST3), during its performance of said control function and for a takeover of said control function, said associated first control apparatus (ST2, ST3, ST1) when said associated first control apparatus (ST2, ST3, ST1) has not been excluded from said periodic exchange, and said associated second control apparatus (ST3, ST1, ST2) when said associated first control apparatus (ST2, ST3, ST1) has been excluded from said periodic exchange; and means (E, e2) for turning over said control function to the prepared associated control apparatus (ST2, ST3, ST1) upon expiration of said first predetermined time.

18. Apparatus as claimed in claim 12, including:
means (ZG2, E, e2) individually associated with each control apparatus (ST1, ST2, ST3) for turning over said control function from any control apparatus (ST1, ST2, ST3) in which said timing means (ZG1) have become defective, to the control apparatus (ST2, ST3 or ST1) in which said timing cycle has been initiated.

19. Apparatus as claimed in claim 12, including:
means (SP) for storing upon the occurrence of a malfunction the addresses and control modes of the peripheral units (P), switching devices (S) and control apparatus (ST) which are then participating in the control operation.

20. Apparatus as claimed in claim 19, including:
means (A) connected to said storing means (SP) for printing out said addresses and control modes.

21. Apparatus as claimed in claim 12, wherein:
said means for periodically exchanging the control apparatus include means (T3, T2, E, e) for turning over the control of said peripheral units (P1–P20) after expiration of said first predetermined time (ZG1) to the other one of said control apparatus (ST2, ST3 or ST1) in which said timing cycle has been initiated.

22. Apparatus as claimed in claim 12, wherein:
said means responsive to a malfunction include means (T1, T4, E, e) connected to said timing cycle initiating means (ZG2) for turning over the control of said peripheral units (P1–P20) to said other one of said control apparatus (ST2, ST3 or ST1) in which said timing cycle has been initiated upon failure of the means (ZG1) for timing said particular control apparatus (ST1, ST2 or ST3).

23. Apparatus as claimed in claim 12, wherein:

said means for periodically exchanging the control apparatus include means (T3, T2, E, *e*) for turning over the control of said peripheral units (P1–P20) after expiration of said first predetermined time (ZG1) to the other one of said control apparatus (ST2, ST3 or ST1) in which said timing cycle has been initiated; and said means responsive to a malfunction include means (T1, T4, E, *e*) connected to said timing cycle initiating means (ZG2) for turning over the control of said peripheral units (P1–P20) to said other one of said control apparatus (ST2, ST3 or ST1) in which said timing cycle has been initiated upon failure of the means (ZG1) for timing said particular control apparatus (ST1, ST2 or ST3).

* * * * *